United States Patent
Pickett, Jr. et al.

(10) Patent No.: US 6,193,283 B1
(45) Date of Patent: Feb. 27, 2001

(54) CONDUIT AND BLOCK CONNECTION INDICATOR DEVICE

(75) Inventors: Paul Matthews Pickett, Jr., North Branch; Robert Jay Slais, West Bloomfield, both of MI (US)

(73) Assignee: Automotive Fluid Systems, Inc., Troy, MI (US)

(*) Notice: Subject to any disclaimer, the term of this patent is extended or adjusted under 35 U.S.C. 154(b) by 0 days.

(21) Appl. No.: 09/430,790

(22) Filed: Oct. 29, 1999

(51) Int. Cl.[7] .......................................... F16L 5/02
(52) U.S. Cl. .................... 285/137.11; 285/142.1; 285/368; 285/906; 29/525.11
(58) Field of Search ................. 285/93, 137.11, 285/139.1, 142.1, 369, 906; 29/525.11, 525.12

(56) References Cited

U.S. PATENT DOCUMENTS

| | | |
|---|---|---|
| 3,319,980 | 5/1967 | Demetriff et al. . |
| 4,020,734 * | 5/1977 | Bell . |
| 4,401,326 | 8/1983 | Blair . |
| 4,676,530 | 6/1987 | Nordgren et al. . |
| 4,733,888 * | 3/1988 | Toelke ..................................... 285/93 |
| 4,753,458 | 6/1988 | Case et al. . |
| 5,161,832 | 11/1992 | McNaughton et al. . |
| 5,163,716 | 11/1992 | Bolton et al. . |
| 5,215,336 * | 6/1993 | Worthing ................................ 285/93 |
| 5,220,967 | 6/1993 | Monyak . |
| 5,228,724 * | 7/1993 | Godeau .................................. 285/93 |
| 5,280,967 * | 1/1994 | Varrin .................................... 285/93 |
| 5,297,818 | 3/1994 | Klinger . |
| 5,340,163 | 8/1994 | Merrer et al. . |
| 5,472,242 | 12/1995 | Petersen . |
| 5,507,531 | 4/1996 | Aldridge . |
| 5,660,417 * | 8/1997 | Reeves .................................. 285/93 |
| 5,727,304 | 3/1998 | Eybergen . |
| 5,992,899 * | 11/1999 | Strowe .................................. 285/93 |

* cited by examiner

Primary Examiner—Dave W. Arola
(74) Attorney, Agent, or Firm—Vanophem Meehan & Vanophem P.C.

(57) ABSTRACT

An engagement device for a cantilevered conduit connection that provides an assembler with visible, audible, and tactile redundant verification that the connection is completely engaged. The engagement device assists in holding a connecting block in place to a housing. The housing includes a fastener port with a fastener fastened therein. The engagement device includes a locking portion at one end thereof, and circumscribes a portion of the fastener. The connecting block mounts to the housing and includes a fastener passage through the connecting block that mounts around the engagement device. The connecting block further includes an engagement surface that mates with the locking portion of the engagement device to assist in fastening the connecting block to the housing. The locking portion of the engagement device expands against the engagement surface of the connecting block to provide visible, audible, and tactile verification that the connecting block is completely engaged to the housing. Additionally, a method of using the engagement device with the cantilevered conduit connection is also disclosed.

13 Claims, 4 Drawing Sheets

CONDUIT AND BLOCK CONNECTION INDICATOR DEVICE

BACKGROUND OF THE INVENTION

1. Field of the Invention

The present invention generally relates to block conduit connections. More specifically, this invention relates to a block conduit connection, wherein a device is used to hold a connecting block in place and indicate if the connection has been completely engaged.

2. Description of the Prior Art

Prior to the present invention, many types of sealing configurations have been proposed for connecting a tube to another component of a fluid system. Perhaps most common was the use of a simple O-ring encircling an end of a tube mounted into a port. The tube would be connected to the port using a coaxial fastener that encircled and entrapped the tube. The coaxial fastener would then be screwed down over corresponding threads on the port-similar to a compression fitting - as is known in the art. Although this configuration was very simple and robust against leakage, its primary drawback was that it could not be assembled quickly enough for the modern-day assembly line. In order to torque the fastener to the female port it was necessary to use hand tools, which was too time consuming. Therefore, devices such as cantilevered block connections were developed since they are quickly and easily torqued down using a power tool.

The cantilevered block connection involves a connecting block typically having a teardrop-shaped profile. The cantilevered block entraps the conduit through a conduit passage therein. Also, the connecting block houses a fastener through another passage just offset from and parallel to the conduit passage. A simple bolt-style fastener is used to draw the connecting block and conduit to the port, where the connection can be fastened quickly with a power tool. However, the cantilevered block connection tends to be more susceptible to leakage than coaxial fastener connections and can present significant warranty problems to automobile manufacturers, if not assembled properly.

Cantilevered conduit connections may leak due to incomplete engagement. Such a connection IOP is illustrated in FIG. 1. For example, during final torque-down a conduit 12P and connecting block 60P tend to misalign, cross-axially, relative to a conduit port 44P in a housing 40P. This misalignment is often the result of the cantilever nature of the cantilevered block connection 10P. That is, since the longitudinal axis of a fastener 80P is not coaxially aligned with the conduit 12P, but is instead offset, any torquing of the fastener 80P often imparts a cantilever effect across the connecting block 60P. The cantilever effect results in a maximum hold-down force along the axis of the fastener 80P and a minimum hold-down force at the opposite end of the connecting block 60P at the far edge of the conduit 12P. Therefore the connecting block 60P often does not mount squarely to the housing 40P and likewise the conduit 12P does not mount squarely within the conduit port 44P. Such cross-axial misalignment results in assembly defects such as cutting, pinching, or insufficient "squeeze" of an O-ring 14P, thus permitting fluid to leak by. Therefore, it is important to ensure a square fit between the connecting block 60P and housing 40P.

To ensure a square fit between the connecting block and the housing it is preferable that the assembler have some way of verifying whether the connection is completely engaged. Devices for verifying are well known in the art of coaxially fastened conduit connections, but, until now, there have not been any attempts to adapt similar technology for a cantilevered conduit connection.

For example, U.S. Pat. No. 4,401,326 to Blair addresses the problem of incomplete engagement of coaxial tubular fittings. Blair discloses a visible snap ring indicator seated within an opening of a female collar that circumscribes a male tube. The male tube mounts into a female tube where the female tube in turn interlocks with the female collar. Blair teaches that upon complete engagement of the female tube into the female collar the visible snap ring becomes unseated and breaks loose of the female collar to provide verification that the connection is completely engaged. While the Blair reference may represent a novel advance in the art of coaxially fastened conduit connections, the structure does not lend itself to cantilevered conduit connections nor does the snap ring indicator provide any audible or tactile verification in the event the snap ring cannot be seen during the assembly process.

Therefore, what is needed is a device for a cantilevered conduit connection that provides an assembler with verification that the connection is completely engaged. What is also needed is a device that provides visible, audible, and tactile feedback to the assembler to provide redundant verification that the connection is completely engaged.

SUMMARY OF THE INVENTION

According to the present invention there is provided a device for a cantilevered conduit connection that provides an assembler with visible, audible, and tactile redundant verification that the connection is completely engaged, wherein the device is adapted to facilitate fastening a connecting block to a housing.

In one form of the invention, the cantilevered conduit connection includes a housing that has a fastener port with a fastener fastened therein. The fastener includes an engagement device circumscribing a portion of the fastener, and the engagement device includes a locking portion at one end thereof. Also included is a connecting block that is mounted to the housing and has a fastener passage circumscribing the engagement device. The connecting block further includes an engagement surface where the locking portion of the engagement device engages the engagement surface to assist in fastening the connecting block to the housing. The locking portion of the engagement device expands against the engagement surface of the connecting block to provide visible, audible, and tactile verification that the connecting block is completely engaged to the housing and held in place. Additionally, a method of using the engagement device with the cantilevered conduit connection is also disclosed.

Accordingly, it is an object of the present invention to provide visible, audible, and tactile verification that a cantilevered conduit connection is fully engaged wherein a conduit is mounted squarely within a conduit port of the housing.

It is another object to provide an engagement device that assists in fastening a connecting block to a housing by trapping the connecting block between the engagement device and the housing.

It is still another object to provide an engagement device that is pre-assembled to a threaded stud.

It is yet another object to provide an engagement device that is compatible with a threaded bolt.

These objects and other features, aspects, and advantages of this invention will be more apparent after a reading of the following detailed description, appended claims, and accompanying drawings.

DETAILED DESCRIPTION OF THE PREFERRED EMBODIMENT

In general, a cantilevered conduit connection is disclosed that incorporates an engagement device that provides verification that the connection has been completely engaged. While the present invention will be described in detail with respect to fluid components, the engagement device is also well suited for use with electrical and other types of conduit. As used herein, the term "fasten" means to securely lock two or more components together. Likewise, the term "engage" means to seat two or more parts together as ready for fastening, and may include the parts being positively held relative to one another.

Figure 1:
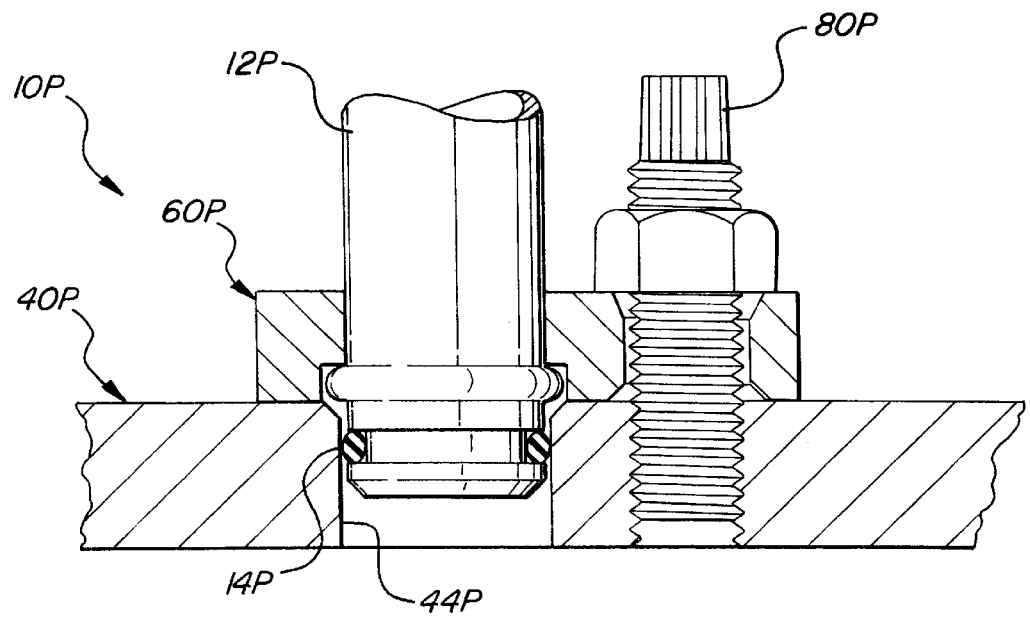
FIG. 1 is a cross-sectional view of an incompletely engaged cantilevered conduit connection of the prior art.
Figure 2:
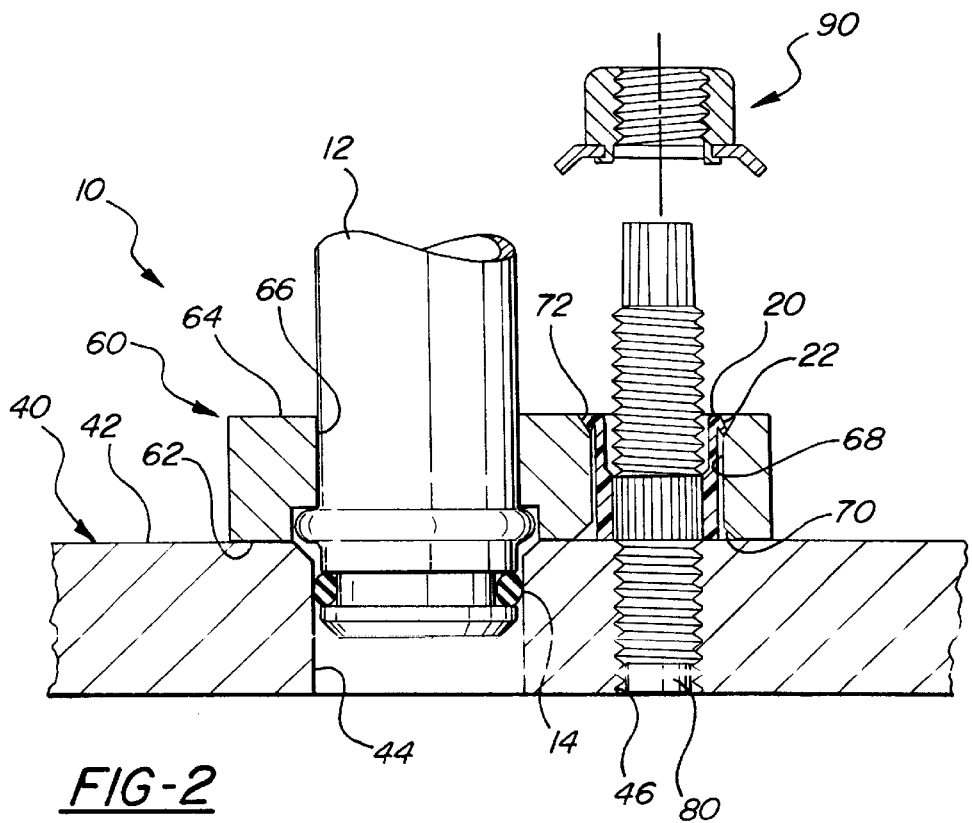
FIG. 2 is a cross-sectional view of a completely engaged cantilevered conduit connection of the present invention using an engagement device.

Referring now in detail to FIG. 2, there is shown a novel cantilevered conduit connection 10 according to the present invention that incorporates an engagement device 20 for verifying if the connection 10 is completely engaged. Here, a housing or fluid component 40 includes a mounting surface 42 and a conduit port 44 and fastener port 46 in the mounting surface 42. A connecting block 60 also has a mounting surface 62, and a fastening surface 64 opposite the mounting surface 62, with a conduit passage 66 and fastener passage 68 extending between both the mounting and fastening surfaces 62 and 64. A conduit 12 extends through the conduit passage 66 of the connecting block 60 and into the conduit port 44 of the fluid component 40. A fastener or threaded stud 80 includes the engagement device 20 circumscribing and press fit to a portion of the threaded stud 80. Further, the threaded stud 80 extends through the fastener passage 68 of the connecting block 60 and threads into the fluid component 40. The mounting surface 62 of the connecting block 60 is mounted to the mounting surface 42 of the fluid component 40 such that the conduit 12 is squarely aligned within the fluid component 40. This assembly method and device will act to seat an O-ring 14 into the conduit port 44 correctly, without damaging the O-ring 14.

Still referring to FIG. 2, the engagement device 20 includes a locking portion or tabs 22 at one end thereof. The mounting surface 62 of the connecting block 60 includes a lead-in chamfer 70 coaxial with the fastener passage 68 to provide an assembly lead-in for the tabs 22 on the engagement device 20. Likewise, the fastening surface 64 includes a back chamfer 72 coaxial with the fastener passage 68 to provide an engagement surface with which the tabs 22 expand against upon complete engagement. The tabs 22 also act to hold the connecting block 60 in place until a flange nut 90 is threaded over the threaded stud 80 to complete assembly of the connection 10.

Figure 3:
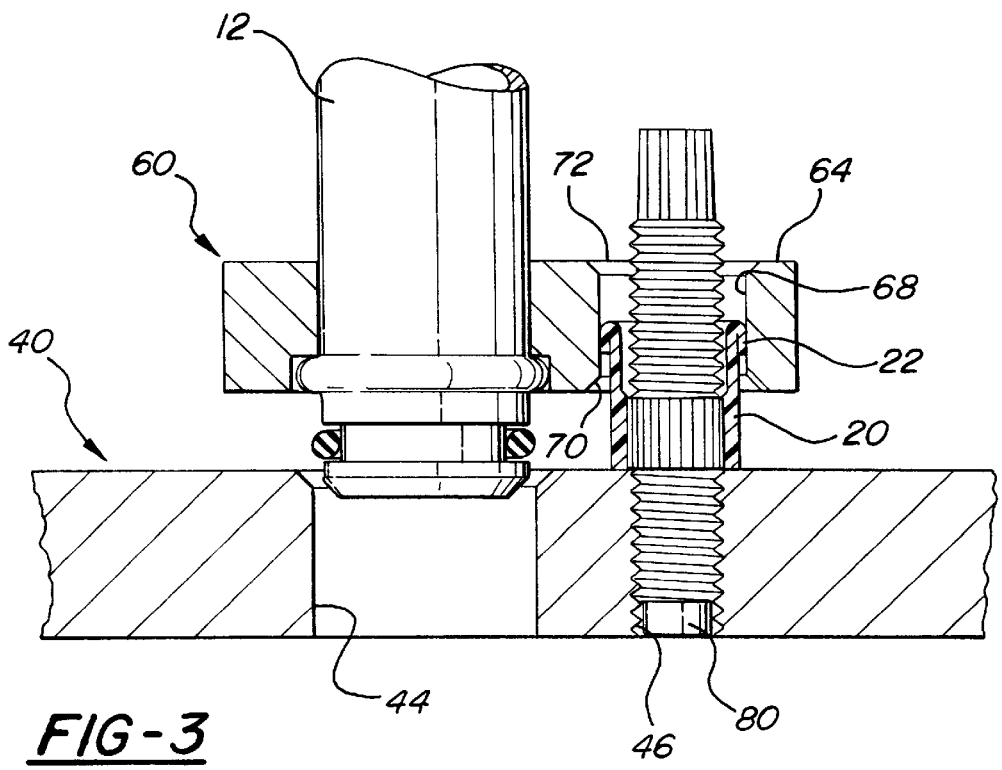
FIG 3 is a partially exploded cross-sectional view of the conduit connection of FIG. 2 illustrating assembly of a connecting block to a housing over the engagement device.

FIG. 3 illustrates the connecting block 60 as it is being assembled to the fluid component 40. Accordingly, the present invention involves a novel method of completely assembling the conduit 12 to the fluid component 40. The method includes providing the conduit 12, connecting block 60, and fluid component 40 described above, releasably securing the threaded stud 80 within the fastener port 46 of the fluid component 40, and assembling the connecting block 60 to the fluid component 40. Assembling the connecting block 60 involves inserting the conduit 12 into the conduit port 44 of the fluid component 40, mounting the fastener passage 68 of the connecting block 60 around the engagement device 20, and verifying that the tabs 22 of the engagement device 20 engage the fastening surface 64 of the connecting block 60. The lead-in chamfer 70 of the connecting block 60 acts to bend the tabs 22 flat, and the fastener passage 68 is sized to permit the tabs 22 to pass therethrough. Upon complete engagement of the connecting block 60 to the fluid component 40 the tabs 22 of the engagement device 20 expand against the back chamfer 72 of the connecting block 60 to provide visible, audible, and tactile verification that the conduit connection 10 is completely engaged and held in place.

Visible verification will be apparent to an assembler when the tabs 22 of the engagement device 20 expand into the back chamfer 72 of the connecting block 60. Audible and tactile verification will be apparent to the assembler when the tabs 22 expand and snap against the sloped sides of the back chamfer 72. Accordingly, the engagement device 20 should be made of a hard resilient material such as nylon or a spring-like metal so that the action of the tabs 22 snapping against the back chamfer 72 emits sound and vibration.

Figure 4:
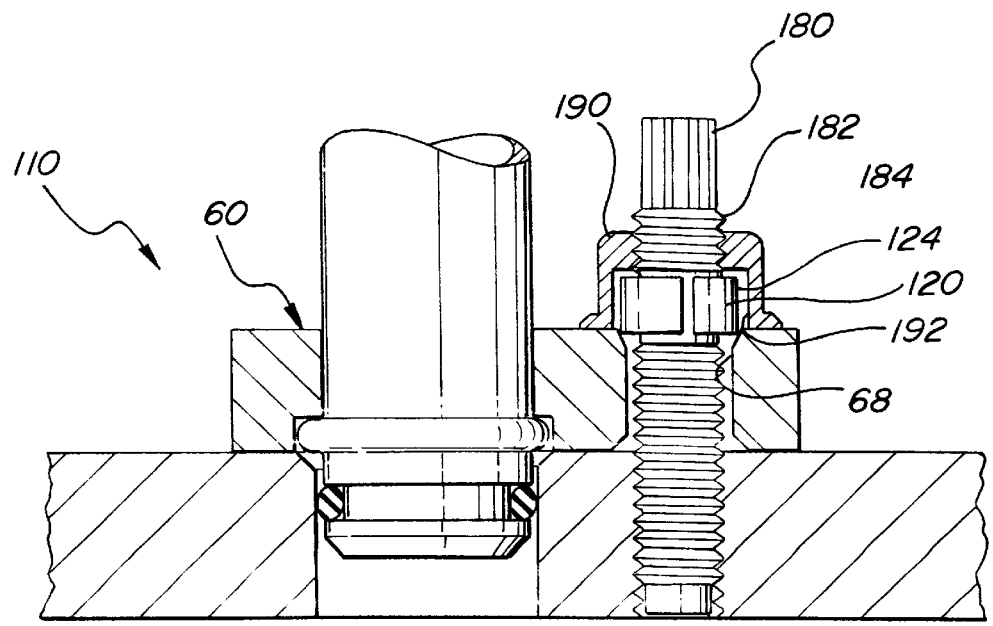
FIG. 4 is a cross-sectional view of a completely engaged cantilevered conduit connection of the present invention using an alternative engagement device.

FIG. 4 illustrates another embodiment of a conduit connection 10 according to the present invention that is similar in most respects to the embodiment of FIGS. 2 and 3.

In contrast, however, an engagement device 120 mounts to a fastener or threaded stud 180 at a recessed portion 184 therein. The engagement device 120 is C-shaped, includes an outer diameter 124 slightly larger than an outer diameter 182 of the threaded stud 180, and is compressible within the recessed portion 184 to conform with the fastener passage 68 of the connecting block 60.

Figure 5:
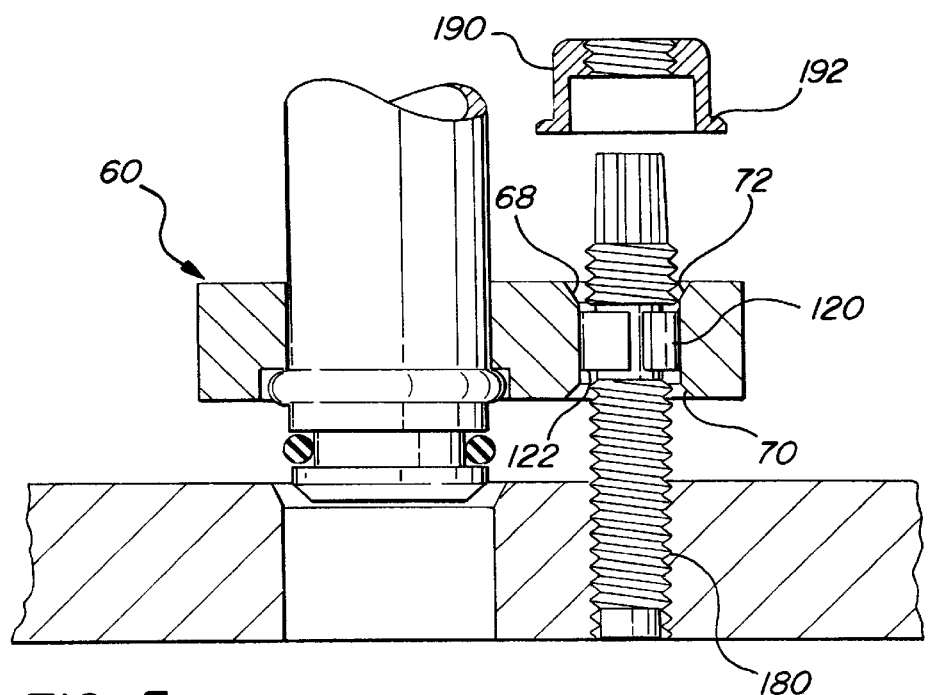
FIG. 5 is a partially exploded cross-sectional view of the conduit connection of FIG. 4 with a connecting block being assembled to a housing over the engagement device of FIG. 4.

As shown in FIG. 5, the connecting block 60 mounts over the engagement device 120 and the lead-in chamfer 70 of the connecting block 60 engages and compresses the engagement device 120 so that the fastener passage 68 slips over the engagement device 120 until a locking portion or bottom surface 122 on the engagement device 120 clears the fastener passage 68 and expands against the back chamfer 72 of the connecting block 60. Again, the engagement device 120 should be made of a hard resilient material such as nylon or a spring-like metal so that the action of the bottom surface 122 snapping against the back chamfer 72 emits sound and vibration. Subsequently, a counterbored nut 190 is threaded over the threaded stud 180 to complete the assembly process. The counterbored nut 190 has a clearance diameter or counterbore 192 for mounting over the engagement device 120.

Figure 6:
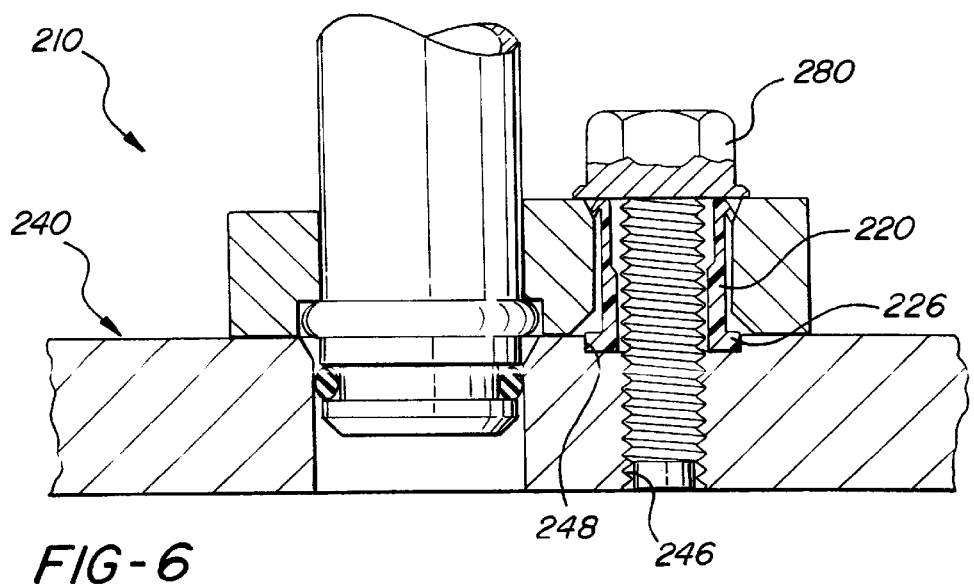
FIG. 6 is a cross-sectional view of a completely engaged cantilevered conduit connection of the present invention using another alternative engagement device.
Figure 7:
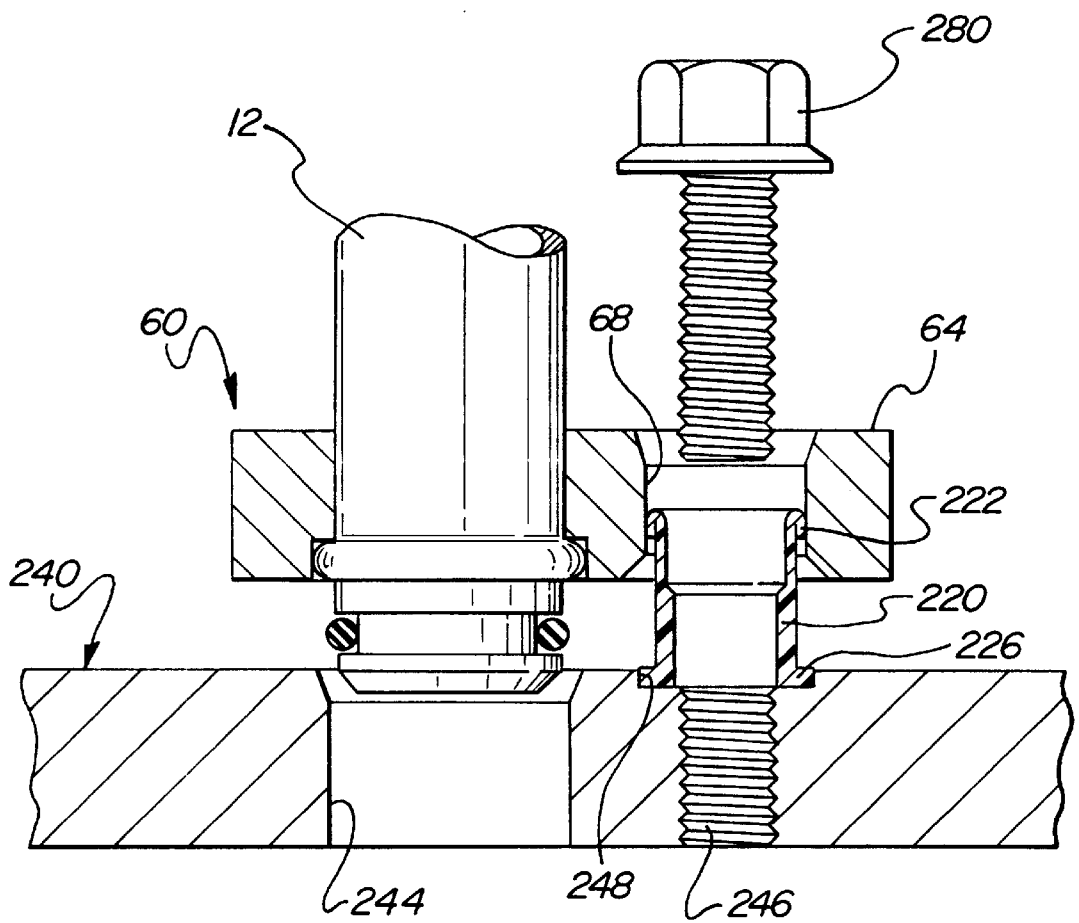
FIG. 7 is a partially exploded cross-sectional view of the conduit connection of FIG. 6 illustrating a connecting block assembled to a housing over the engagement device of FIG. 6.

FIG. 6 illustrates yet another embodiment showing a completely assembled conduit connection 210 according to the present invention that uses an engagement device 220 that is similar to the embodiment of FIGS. 2 and 3. In contrast, however, the engagement device 220 is pre-assembled to a fluid component 240. The engagement device 220 has a shoulder portion 226 at one end that press fits into a counterbore 248 of a fastener port 246 of the fluid component 240. In addition, a fastener or bolt 280 is inserted through the engagement device 220 after the connection 210 has been engaged. FIG. 7 best reflects that a method of connecting the conduit 12 to the fluid component 240 includes providing the connecting block 60 and fluid component 240, and inserting the shoulder portion 226 of the engagement device 220 into the counterbore 248 of the fluid component 240. Further included is a step of assembling the connecting block 60 to the fluid component 240 by inserting the conduit 12 into a conduit port 244 of the fluid component 240, mounting the fastener passage 68 over the engagement device 220, and verifying that a locking portion or tabs 222 at an opposite end of the engagement device 220 engages the fastening surface 64 of the connecting block 60. Finally included is a step of releasably securing the bolt 280 through the engagement device 220 and into the fastener port 246 of the fluid component 240.

Referring in general to all of the figures, an assembler can visually verify complete engagement of the conduit connection when the locking portion of the engagement device expands into the engagement surface of the connecting block. Audible and tactile verification will be apparent to the assembler when the locking portion expands and snaps against the sloped sides of the back chamfer. Accordingly, the engagement device should be made of a hard resilient material such as nylon or a spring-like metal so that the action of the locking portion snapping against the back chamfer emits sound and vibration.

From the above, it can be appreciated that a significant advantage of the conduit connection of the present invention is that the engagement device provides visible, audible, and tactile verification to an assembler that the connection is completely engaged.

This helps to error-proof the assembly process and improve the sealability of the conduit connection so the connection will not become damaged during assembly thereby preventing leakage.

An additional advantage is that the engagement device also keeps the connecting block held to the fluid component until the fastener completely fastens the connecting block to the fluid component. The engagement device is press fit to the fastener or fluid component itself and the locking portion of the engagement device traps the connecting block to the fluid component.

While the present invention has been described in terms of a preferred embodiment, it is apparent that other forms could be adopted by one skilled in the art. For example, the locking portion of the engagement device can include only one tab or a plurality of tabs, or can simply include a projection that serves the same purpose. In addition, the engagement surface defined by the back chamfer may otherwise be defined by a counterbore or other recess. Accordingly, the scope of the present invention is to be limited only by the following claims.

What is claimed is:

1. A conduit connection, comprising:
   a housing having a fastener port and a conduit port offset from said fastener port;
   a conduit having an annular bead spaced a predetermined distance from one end, said one end being inserted into said conduit port of said housing;
   a connecting block abutting said housing, said connecting block comprising:
      a conduit passage therethrough, said conduit located into said conduit passage such that said annular bead of said conduit is trapped between said connecting block and said housing;
      a fastener passage therethrough, said fastener passage being offset from said conduit passage; and
      an engagement surface thereon;
   means for fastening said connecting block to said housing, said means for fastening mounted in said fastener passage of said connecting block and said fastener port of said housing; and
   means for indicating full engagement of said connecting block to said housing, said means for indicating being interposed between said means for fastening and said fastener passage of said connecting block, said means for indicating communicating with said means for fastening and said engagement surface of said connecting block to provide visible, audible, and tactile verification that said connecting block is fully engaged with said housing.

2. The conduit connection as claimed in claim 1, wherein said means for a fastening comprises:
   a threaded stud threaded into said fastener port of said housing; and
   a nut threaded onto said threaded stud;
   whereby said nut is torqued down on said threaded stud and against said connecting block to complete assembly of said conduit connection; and
   said means for indicating comprises:
      an engagement device locked to a portion of said threaded stud in order to hold said engagement device relative to said housing, said engagement device comprising a locking portion at one end thereof for engaging said engagement surface of said connecting block;
      whereby said locking portion of said engagement device engages said engagement surface of said connecting block to trap said connecting block between said locking portion of said engagement device and said housing, such that said locking portion holds said connecting block relative to said housing, and further such that upon engagement of said connecting block to said housing said locking portion of said engagement device expands against said engagement surface of said connecting block to provide visible, audible, and tactile verification that said connecting block is completely engaged with said housing.

3. The conduit connection as claimed in claim 2, wherein said threaded stud further comprises a recessed portion thereon, said engagement device circumscribing said recessed portion.

4. The conduit connection as claimed in claim 2, wherein said engagement device is composed of a resilient nylon material.

5. The conduit connection as claimed in claim 2, wherein said engagement device is composed of a resilient metal material.

6. The conduit connection as claimed in claim 2, wherein said locking portion of said engagement device includes resilient tabs.

7. The conduit connection as claimed in claim 2, wherein said engagement device comprises a bottom surface, said bottom surface engaging said engagement surface to hold said connecting block to said housing.

8. The conduit connection as claimed in claim 2, wherein said engagement surface of said connecting block includes a chamfer therein coaxial with said fastener passage.

9. The conduit connection as claimed in claim 1, wherein said means for indicating comprises:
   an engagement device locked to a portion of said housing to hold said engagement device relative to said housing, said engagement device comprising a locking portion at one end thereof for engaging said engagement surface of said connecting block;
   whereby said locking portion of said engagement device engages said engagement surface of said connecting block to trap said connecting block between said locking portion of said engagement device and said housing, such that said locking portion holds said connecting block relative to said housing, and further such that upon engagement of said connecting block to said housing said locking portion of said engagement device expands against said engagement surface of said connecting block to provide visible, audible, and tactile verification that said connecting block is completely engaged with said housing; and further wherein
   said means for fastening comprises a bolt threaded into said fastener port of said housing, said bolt having a head thereon, whereby said head is torqued down against said connecting block to complete assembly of said conduit connection.

10. A conduit connection for fluid flow therethrough, said conduit connection comprising:
    a fluid component including a conduit port therein and a fastener port therein offset from said conduit port;
    a conduit having an annular bead spaced from one end, said one end being inserted into said conduit port of said fluid component;
    a connecting block mounted to said fluid component, said connecting block comprising:
    an engagement surface thereon;
    a conduit passage therethrough, said conduit extending into said conduit passage such that said annular bead of said conduit is trapped between said connecting block and said fluid component; and
    a fastener passage therethrough, said fastener passage being offset from said conduit passage;
    means for fastening said connecting block to said fluid component, said means for fastening interlocking with said fastener port of said fluid component; and
    an engagement device locking to a portion of said means for fastening to hold said engagement device relative to said fluid component, said engagement device having a locking portion at one end thereof for engaging said engagement surface of said connecting block;
    whereby said fastener passage mounts over said engagement device, further said locking portion of said engagement device engages said engagement surface of said connecting block to trap said connecting block between said locking portion of said engagement device and said fluid component, such that said locking portion holds said connecting block relative to said fluid component, such that upon engagement of said connecting block to said fluid component said locking portion of said engagement device expands against said engagement surface of said connecting block to provide visible, audible, and tactile verification that said connecting block is completely engaged to said fluid component.

11. A conduit connection for fluid flow therethrough, said conduit connection comprising:
    a fluid component comprising a conduit port therein and a fastener port therein offset from said conduit port;
    a conduit having an end extending into said conduit port of said fluid component, said conduit further having an annular bead spaced from said end;
    a connecting block mounted to said fluid component, said connecting block comprising:
    an engagement surface thereon;
    a conduit passage therethrough, said conduit extending into said conduit passage such that said annular bead of said conduit is trapped between said connecting block and said fluid component; and
    a fastener passage therethrough offset from said conduit passage;
    an engagement device mounted and locked at one end thereof within a portion of said fastening port of said fluid component to hold said engagement device relative to said fluid component, said engagement device comprising a locking portion at an opposite end thereof for engaging said engagement surface of said connecting block, whereby said locking portion of said engagement device engages said engagement surface of said connecting block to trap said connecting block between said locking portion of said engagement device and said fluid component, such that upon engagement of said connecting block to said fluid component said locking portion of said engagement device expands against said engagement surface of said connecting block to provide visible, audible, and tactile verification that said connecting block is completely engaged to said fluid component; and
    a threaded fastener mounted through said engagement device and into said fastener port of said fluid component, said threaded fastener being torqued down against said connecting block to fasten said connecting block to said fluid component to complete assembly of said conduit connection.

12. A method of connecting a conduit having an annular bead to a component to form a conduit connection, said method comprising the steps of:
    providing a connecting block comprising an engagement surface thereon, said connecting block further comprising a conduit passage therethrough and a fastener passage therethrough and offset from said conduit passage, said conduit passage receiving said conduit therethrough;
    providing a conduit port and a fastener port offset from said conduit port in said component;
    releasably securing a threaded stud within said fastener port of said component, said threaded stud comprising an engagement device locked therearound to a portion thereof, said engagement device having a locking portion thereon;
    mounting said fastener passage over said engagement device;
    assembling said connecting block to said component by inserting said conduit into said conduit port of said component to trap said annular bead of said conduit between said connecting block and said component;

verifying that said locking portion of said engagement device engages said engagement surface of said connecting block to trap said connecting block between said locking portion of said engagement device and said component, such that upon engagement of said connecting block to said component, said locking portion of said engagement device expands against said engagement surface of said connecting block to provide visible, audible, and tactile verification that said conduit connection is completely engaged; and releasably securing a nut to said threaded stud to fasten said connecting block to said component to complete connecting said conduit to said component.

13. A method of connecting a conduit having an annular bead to a component to form a conduit connection, said method comprising the steps of:

providing a connecting block comprising an engagement surface thereon, said connecting block further comprising a conduit passage therethrough and a fastener passage therethrough offset from said conduit passage, said conduit passage receiving said conduit therethrough;

providing a conduit port in said component and a fastener port in said component offset from said conduit port;

inserting and locking an engagement device into a portion of said fastener port of said component, said engagement device comprising a locking portion thereon;

mounting said fastener passage over said engagement device;

assembling said connecting block to said component by inserting said conduit into said conduit port of said component to trap said annular bead of said conduit between said connecting block and said component;

verifying that said locking portion of said engagement device engages said engagement surface of said connecting block to trap said connecting block between said locking portion of said engagement device and said component, such that upon engagement of said conduit connection said locking portion of said engagement device expands against said engagement surface of said connecting block to provide visible, audible, and tactile verification that said conduit connection is completely engaged; and releasably securing a fastener through said engagement device and into said fastener port of said component to fasten said connecting block to said component to complete connecting said conduit to said component.

\* \* \* \* \*

UNITED STATES PATENT AND TRADEMARK OFFICE
CERTIFICATE OF CORRECTION

PATENT NO.    : 6,193,283 B1
DATED         : February 27, 2001
INVENTOR(S)   : Pickett, Jr. et al.

It is certified that error appears in the above-identified patent and that said Letters Patent is hereby corrected as shown below:

Column 3,
Line 11, after "FIG" insert a period -- . --.

Column 4,
Line 43, delete "10" and insert -- 110 --.

Column 6,
Line 28, after "for" delete -- a --.

Signed and Sealed this

Twenty-sixth Day of March, 2002

*Attest:*

JAMES E. ROGAN
*Attesting Officer*     *Director of the United States Patent and Trademark Office*